United States Patent [19]
Kimura

[11] Patent Number: 5,287,364
[45] Date of Patent: Feb. 15, 1994

[54] PORTABLE SEMICONDUCTOR DATA STORAGE DEVICE

[75] Inventor: Masatoshi Kimura, Himeji, Japan

[73] Assignee: Mitsubishi Denki Kabushiki Kaisha, Tokyo, Japan

[21] Appl. No.: 824,527

[22] Filed: Jan. 23, 1992

[30] Foreign Application Priority Data

Jan. 24, 1991 [JP] Japan ................... 3-22713

[51] Int. Cl.5 .......................... H03M 13/00
[52] U.S. Cl. ................................. 371/40.4
[58] Field of Search ............. 371/40.4, 40.1, 37.2, 371/10.1, 10.2, 8.1, 37.7, 49.2, 21.1

[56] References Cited

U.S. PATENT DOCUMENTS

| | | | |
|---|---|---|---|
| 4,166,211 | 8/1979 | York et al. | 235/312 |
| 4,581,734 | 4/1986 | McMahon, Jr. | 371/21 |
| 4,612,640 | 6/1986 | Mehrotra et al. | 371/51 |
| 4,617,664 | 10/1986 | Aichelmann, Jr. et al. | 371/37.7 |
| 4,899,342 | 2/1990 | Potter et al. | 371/40.1 |
| 4,918,695 | 4/1990 | Scheuneman et al. | 371/51.1 |
| 5,025,418 | 6/1991 | Asoh | 371/10.2 |
| 5,063,565 | 11/1991 | Ohashi | 371/40.4 |
| 5,161,157 | 11/1992 | Owen et al. | 371/10.2 |

FOREIGN PATENT DOCUMENTS 61-161565 7/1986 European Pat. Off. .

OTHER PUBLICATIONS

Bazes et al., "Keep Memory Design Simple Yet Cull Single-Bit Errors", 2328 Electron Design, vol. 29 (1981) Sep., No. 20, Waseca, Minn., USA, pp. 195-201.
"Dual ECC Scheme To Reduce Read-Modify-Write Cycles On A 32-Bit Data Bus Memory System", IBM Technical Disclosure Bulletin, vol 28, No. 6, Nov. 1985, p. 2561.
Electronic, "Viel Leistung-Weng Platz", vol. 37, No. 17, Aug. (1988), pp. 42-43 (No translation).

Primary Examiner—Robert W. Beausoliel, Jr.
Assistant Examiner—Phung Chung
Attorney, Agent, or Firm—Leydig, Voit & Mayer

[57] ABSTRACT

A portable semiconductor data storage device includes a data word storage circuit for storing data words, a redundant word storage circuit for storing redundant words relative to the data words, an error detection circuit for detecting an error bit in a data word stored in the data word storage circuit from the redundant word stored in the redundant word storage circuit, and an error correction circuit for correcting the erroneous bit detected by the error detection circuit.

4 Claims, 5 Drawing Sheets

PORTABLE SEMICONDUCTOR DATA STORAGE DEVICE

BACKGROUND OF THE INVENTION

1. Field of the Invention

The present invention relates to a portable semiconductor data storage device having a single bit error correction function, and more particularly, to an improvement in the reliability of the data storage device.

2. Description of the Related Art

FIG. 7 shows a conventional portable semiconductor storage device. An input/output buffer 7 is connected to a voltage control circuit 30, and a group of memory ICs 1 for storing data is connected to the input/output buffer 7. The group of memory ICs 1 consists of eight least significant byte storing memories 2a to 2h for storing the least significant bytes, and eight most significant byte storing memories 3a to 3h for storing the most significant bytes. An address bus 9, a control bus 10 and a data bus 14 are connected to the input/output buffer 7. The control bus 10 includes an output enable signal line OE, a write enable signal line WE, and card enable signal lines CE1 and CE2. The input/output buffer 7 works as an address buffer, data bus buffer and a control bus buffer. Practically, the input/output buffer 7 can operate in accordance with the following function table.

| Operation Mode | CE2 | CE1 | A0 | D15-D8 | D7-D0 |
|---|---|---|---|---|---|
| Standby Mode | H | H | X | High Impedance | High Impedance |
| The least significant byte control | H | L | L | High Impedance | Even Byte |
| The most significant byte control | H | L | H | High Impedance | Odd Byte |
| Word Control | L | L | X | Odd Byte | Even Byte |

In the above table, A0 indicates the least significant bit of the address bus 9, and D15-D0 denotes the individual bits of the data bus 14. That is, the input/output buffer 7 controls the least and the most significant byte and the word (the least significant byte + the most significant byte) by means of the card enable signal lines CE1 and CE2 and the least significant bit A0 of the address bus 9.

The operation of the above portable semiconductor data storing device will be described below. When the storage device shown in FIG. 7 is connected to a terminal machine (not shown), power is supplied from the terminal machine to a power input line 34. When the voltage on the power input line 34 has reached a predetermined threshold value, the voltage control circuit 30 connects the power input line 34 to an internal power line 35 and sends out a "H" level protect signal to the input/output buffer 7 to enable the input/output buffer 7. In this state, the terminal can access to the memory ICs in each of the modes listed on the function table.

On the other hand, when the power supply from the terminal machine stops and the voltage on the power input line 34 thereby drops to the predetermined threshold value or less, such as while the data storage device is being carried from place to another, the voltage control circuit 30 is disconnected, and sends out a "L" level protect signal to the input/output buffer 7. Consequently, all the chip select signals CSL0 to CSL7 and CSH0 to CSH7 output from the input/output buffer 7 to the least and the most significant byte storing memories 2a to 2h and 3a to 3h rise to the "H" level, and these memories 2a to 2h and 3a to 3h are thereby disabled. In that case, power is supplied from a cell 33 incorporated in the data storage device to the internal power line 35 through a reverse-charge preventing diode 31 and a limiting resistor 32 to back up the data stored in the memories 2a to 2h and 3a to 3h.

Soft errors, i.e., non-fatal recoverable random failures, in the memory ICs of the portable semiconductor data storage device, will be described. Generally, soft errors are caused in the semiconductor memories because of alpha rays, hot carriers, and other, random, failures. Soft errors normally occur in a single bit in the total storage areas of the memory ICs. Assuming that the soft error rate is 50 to 300 FIT/piece, the error rate of a portable semiconductor data storage device including 16 memory ICs is 800 to 4800 FIT. In the case of a system including, for example, 1000 portable semiconductor data storage devices, soft errors occur in 8 to 48 storage devices in $10^4$ hours (about in 1.14 years). FIT is the unit which indicates the failure rate. 1 FIT is $1 \times 10^{-9}$ failures/operating hour.

Thus, generation of soft errors reduces the reliability of the conventional portable semiconductor data storage device and may lead to a failure in system operation.

SUMMARY OF THE INVENTION

Accordingly, an object of the present invention is to provide a portable semiconductor data storage device with reduced failure rate due to soft errors to enhance reliability.

In order to achieve the above objects, there is provided a portable semiconductor data storage device which comprises a data word storage means for storing data words, a redundant word storage means for storing redundant words relative to the data words, an error detection means for detecting an erroneous bit from one of the data word stored in the data word storage means from the data word and the corresponding redundant word stored in the redundant word storage means, and an error correction means for correcting the erroneous bit detected by the error detection means.

In this invention, the error detection means detects an error bit from the data word stored in the data word storage means and the redundant word stored in the redundant word storage means, and the error correction means corrects the detected error bit.

DESCRIPTION OF THE PREFERRED EMBODIMENT

An embodiment of the present invention will be described below with reference to the accompanying drawings.

Figure 1:
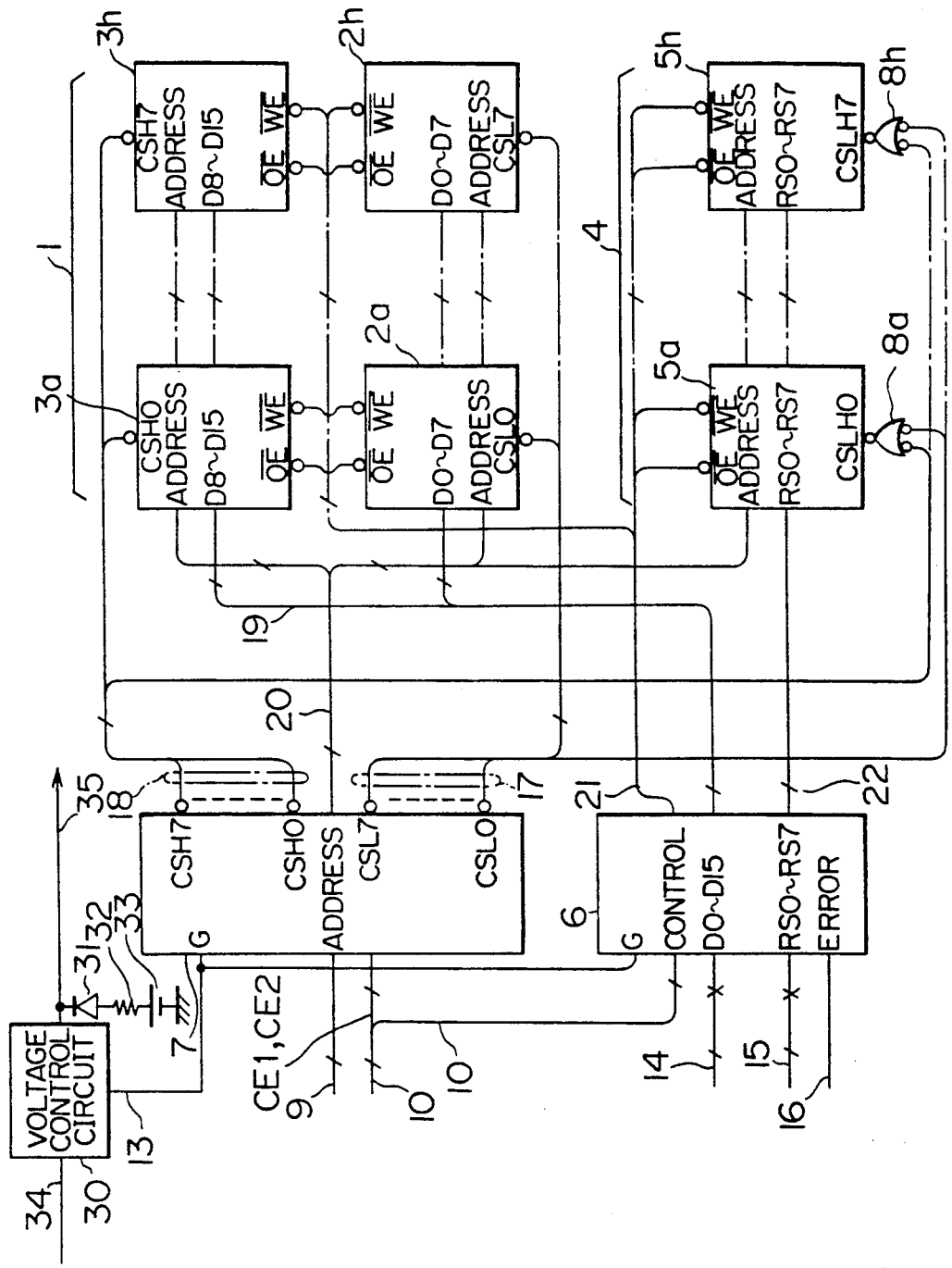
FIG. 1 is a block diagram of an embodiment of a portable semiconductor data storage device according to the present invention.

Referring first to FIG. 1, the input/output buffer 7 is connected to the voltage control circuit 30 through a protect signal line 13, and the group of data word memory ICs 1, which is the data word storage means, and a group of redundant word memory ICs 4, which is the redundant word storage means, are connected to the input/output buffer 7 through an internal address bus 20. The group of memory ICs 1 includes eight least significant byte storing memories 2a to 2h for storing the least significant bytes, and the eight most significant byte storing memories 3a to 3h for storing the most significant bytes. The group of memory ICs 4 includes eight redundant word storing memories 5a to 5h. The address bus 9 and the card enable signal lines CE1 and CE2 in the control bus 10 are connected to the input/output buffer 7. The input/output buffer 7 is connected to each of the least significant byte storing memories 2a to 2h through chip select signal lines 17, and is connected to each of the most significant byte storing memories 3a to 3h through chip select signal lines 18. The input/output buffer 7 has the buffering function for the address bus 9, and the decoding function for selectively controlling the least and most significant byte storing memories 2a to 2h and 3a to 3h. The input/output buffer 7 can operate in the modes listed in the above function table.

AND circuits 8a to 8h are respectively connected to the redundant word storing memories 5a to 5h, and chip select signals CSL0 to CSL7 and CSH0 to CSH7 are input from the input/output buffer 7 to the corresponding AND circuits 8a to 8h.

An error detecting/correcting circuit 6 is connected to the control bus 10 and to a protect signal line 13 extending from the voltage control circuit 30. To this error detecting/correcting circuit 6 are connected a data bus 14, redundant word signal lines 15 and an error detecting signal line 16 which are to be connected to a terminal machine (not shown). The error detecting/correcting circuit 6 is connected to the data word memory ICs 1 through an internal data bus 19, and to the redundant word memory ICs 4 through internal redundant word signal lines 22. The error detecting/correcting circuit 6 is also connected to these memory ICs 1 and 4 through a memory read/write signal line The power input line 34 and the internal power source line 35 are connected to the voltage control circuit 30. The cell 33 is connected to the internal power source line 35 through the reverse-charge preventing diode 31 and the limiting resistor 32.

Figure 2:
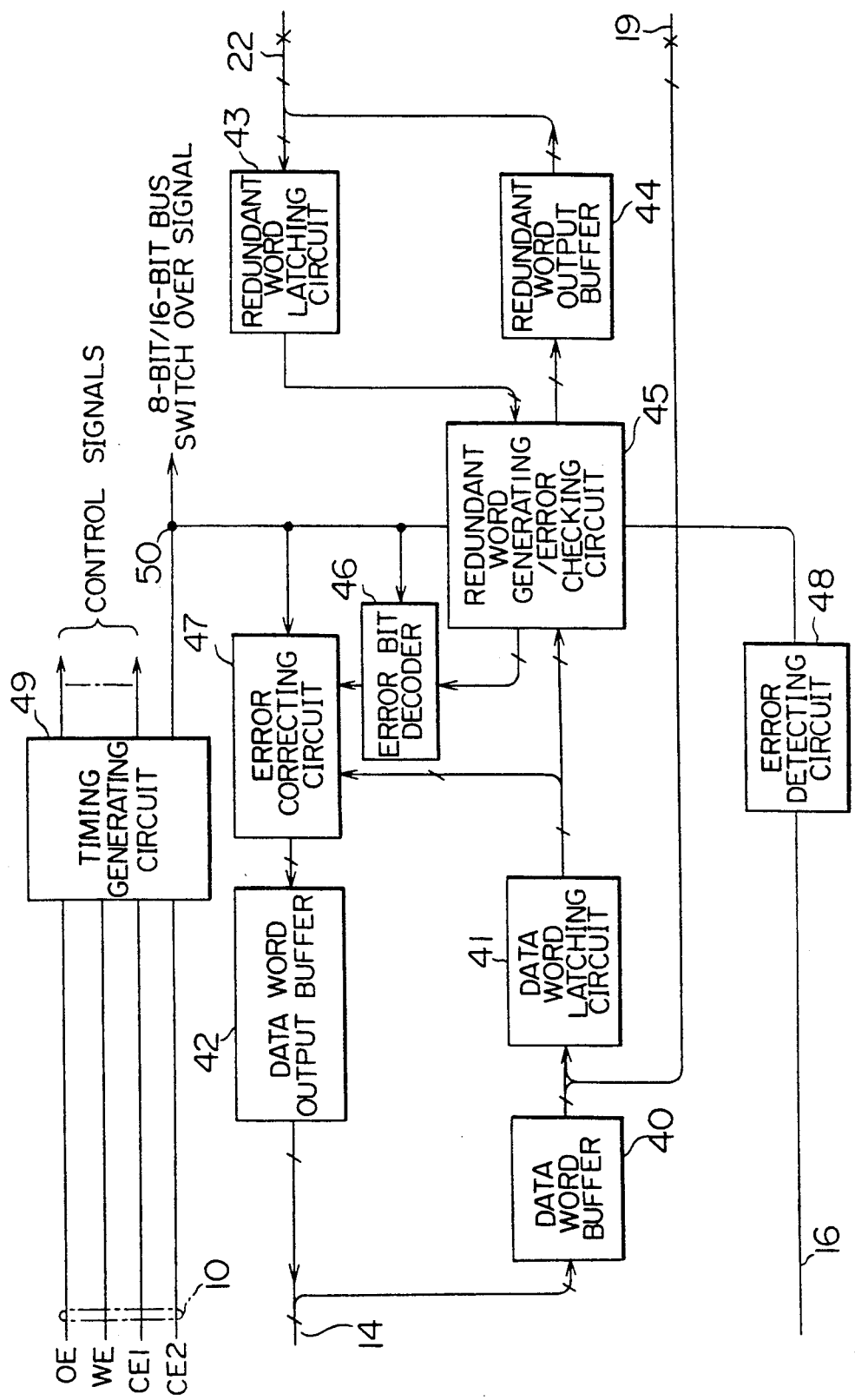
FIG. 2 is a block diagram of an error detection/correction circuit used in the embodiment of FIG. 1.

The error detecting/correcting circuit 6 is part of an error detection and the error correction means, and has the internal configuration shown in FIG. 2. A data word buffer 40 and a data word output buffer 42 are connected to the data bus 14. A redundant word generating/error checking circuit 45 is connected to the data word buffer 40 through a data word latching circuit 41, and an error correcting circuit 47 is connected to this redundant word generating/error checking circuit 45 through an error bit decoder 46. The error correcting circuit 47 is connected to the data word latching circuit 41 and to the data word output buffer 42. An error detecting signal line 16 is connected to the redundant word generating/error checking circuit 45 through an error detecting circuit 48, and internal redundant word signal lines 22 are connected to the redundant word generating/error checking circuit 45 through a redundant word latching circuit 43 and through a redundant word output buffer 44. A timing generating circuit 49 is connected to the control bus 10, and an 8-bit/16-bit bus switch-over signal 50 is output from this timing generating circuit 49 to the redundant word generating/error checking circuit 45, to the error bit decoder 46 and to the error correcting circuit 47. The control bus 10 includes a memory read signal line OE, a memory write signal line WE, and card enable signal lines CE1 and CE2. The internal data bus 19 is connected to the data word buffer 40 and the data word latching circuit 41.

The relation between the data word length and the redundant word length will be discussed. It is known that $2^{K-1} \geq N$ and $N = M + K$, where M is the data word length and K is the redundant word length, must be satisfied to achieve one bit error detection and one bit error correction. In the case of, for example, a data bus whose M is 8 bits, one bit error detection and correction requires a redundant word length K of 4 bits or more.

Various methods of determining the individual bits R0 to R3 of the redundant word are known. For example, they may be determined such that $R0 = D0 + D1 + D3 + D4 + D6$, $R1 = D0 + D2 + D3 + D5 + D6$, $R2 = D1 + D2 + D3 + D7$, $R3 = D4 + D5 + D6 + D7$. This means that four types of weighted parity bits are generated relative to each bit of the data words. Let the results of computation performed in this parity check on the individual bits R0 to R3 be respectively RS0 to RS3. One bit error correction can be made by decoding these results, by reversing only the corresponding bits, and by outputting this redundant word to the data bus.

In the case of a 16-bit data word (M = 16), $K \geq 5$ from the above-described expressions, and a redundant word having a length of at least 5 bits is required. In this case, the individual bits R0 to R4 of the redundant word can be determined in various methods, as in the aforementioned case. For example, they may be determined such that $R0 = D0 + D1 + D3 + D4 + D6 + D8 + D10 + D11 + D13 + D15$, $R1 = D0 + D2 + D3 + D5 + D6 + D9 + D10 + D12 + D13$, $R2 = D1 + D2 + D3 + D7 + D8 + D9 + D10 + D14 + D15$, $R3 = D4 + D5 + D6 + D7 + D8 + D9 + D10$, $R4 = D11 + D12 + D13 + D14 + D15$.

Figure 3:
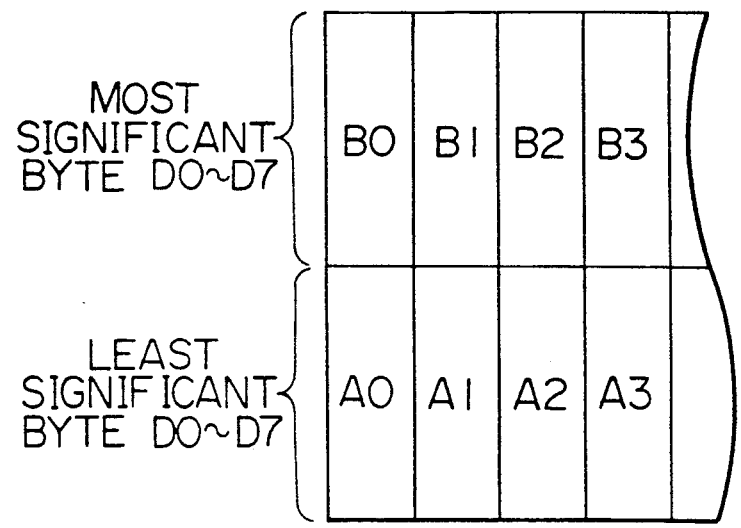
FIG. 3 shows a method of storing data words in 8-bit access.
Figure 4:
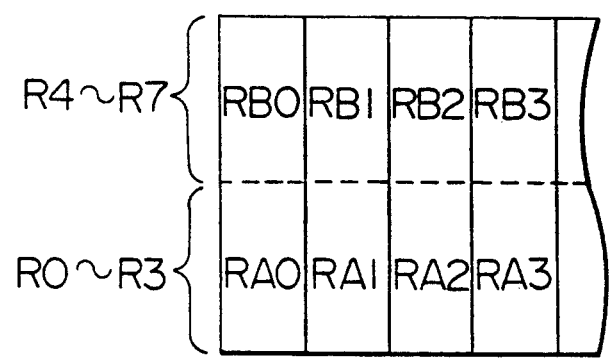
FIG. 4 shows a method of storing redundant words in 8-bit access.
Figure 5:
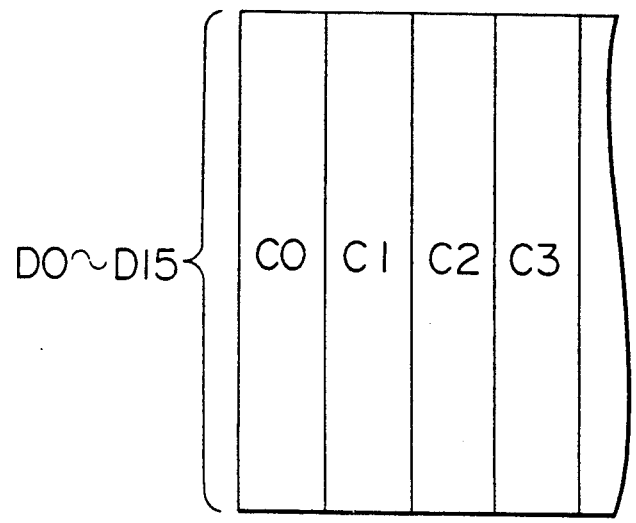
FIG. 5 shows a method of storing data words in 16-bit access.
Figure 6:
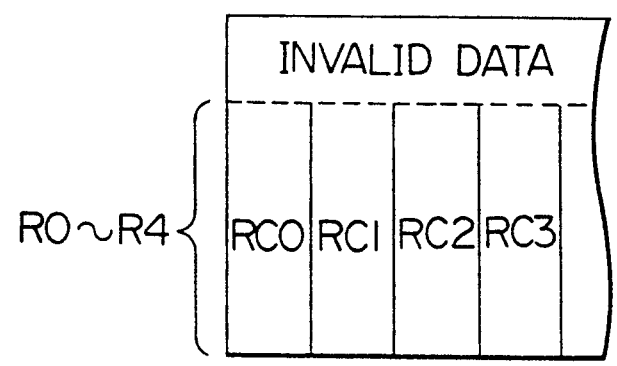
FIG. 6 shows a method of storing redundant words in 16-bit access.

In this embodiment, the efficiency with which the redundant word memory ICs 4 for storing the redundant word are used can be improved in the manner described below: in an 8-bit bus access in which data words A0 to A3 and B0 to B3 are respectively stored in the least and most significant byte memories, as shown in FIG. 3, the redundant word RA0 to RA3 for the least significant byte is stored in the memories 5a to 5h using the 4 bits R0 to R3 in the 8 bits thereof while the redundant word RB0 to RB3 for the most significant byte is stored using the remaining 4 bits R4 to R7, as shown in FIG. 4. In the case of a 16-bit bus access in which data word C0 to C3 is stored using 16 bits as shown in FIG. 5, the redundant word RC0 to RC3 is stored in the memories 5a to 5h using 5 bits R0 to R4 in the 8 bits thereof, as shown in FIG. 6.

The memories 5a to 5h can be effectively utilized and the number of memories can be minimized by using the redundant word storing memories 5a to 5h in common for the individual buses of the least and most significant bytes and the least significant byte + the most significant byte, as stated above. That is, in a case where 16 data word storing memories 2a to 2h and 3a to 3h are incorporated, only 8 redundant word storing memories 5a to 5h are required.

The operation of this embodiment will now be described. As the portable semiconductor data storing device shown in FIG. 1 is connected to a terminal machine (not shown), power is supplied from the terminal machine to the power input line 34. When the voltage on the power input line 34 exceeds a predetermined threshold value, the voltage control circuit 30 electrically connects makes the power input line 34 to the internal power line 35, and at the same time sends out a "H" level protect signal to both the input/output buffer 7 and the error detecting/correcting circuit 6 to enable them. At that time, the error detecting/correcting circuit 6 is interfaced with the terminal machine (not shown) by means of the data bus 14, the control bus 10 and the error detecting signal line 16. Also, collection of the redundant word from the storage device through the redundant word signal lines 15 and accumulation of data on the memory IC or site where a failure has occurred can be made possible by the terminal machine.

When the data word is written in, the data word on the data bus 14 is stored in the corresponding memories in the group of data word memory ICs 1 through the data word buffer 40 and the internal data bus 19. At the same time, the data word is held in the data word latching circuit 41 and then supplied to the redundant word generating/error checking circuit 45. The timing generating circuit 49 determines whether data is stored in 8- or 16-bit bus access on the basis of the aforementioned function list from the logical levels of the card enable signal lines CE1 and CE2 of the control bus 10, and outputs a 8-bit/16-bit bus switch-over signal 50 to the redundant word generating/error checking circuit 45, error bit decoder 46 and error correcting circuit 47.

The redundant word generating/error checking circuit 45 performs a parity bit computation using the data word supplied thereto through the data word latching circuit 41, generates a redundant word (check code) having a number of bits corresponding to the data bus length indicated by the 8-bit/16-bit bus switch over signal 50, and stores the generated redundant word in the group of redundant word memory ICs 4 through the redundant word output buffer 44. At that time, the redundant word is stored in 4 bits R0 to R3 of the memories 5a to 5h in the case of the least significant byte control, or in the 4 bits R4 to R7 in the case of the most significant byte control. In the case of word control, the redundant word is stored in 5 bits R0 to R4. In this writing cycle, the groups of memory ICs 1 and 4 are controlled by means of the timing generating circuit 49 such that the other functions thereof are disabled.

When the data is read out, the data word stored in the group of memory ICs 1 and the redundant word stored in the group of memory ICs 4 are respectively read out to and latched in the data word latching circuit 41 and the redundant word latching circuit 43 of the error detecting/correcting circuit 6 through the internal data bus 19 and internal redundant word signal lines 22, and then are output to the redundant word generating/error checking circuit 45. The redundant word generating/error checking circuit 45 performs a parity bit computation, as in the case of writing cycle, and sends out the results of the computation together with the redundant word supplied from the redundant word latching circuit 43 to the error bit decoder 46, which designates the erroneous bit position. The error correcting circuit 47 corrects the erroneous bit.

The data word on which error correction has been conducted is read out from the data word output buffer 42 to the terminal machine through the data bus 14. At that time, the data word on which error correction has been made can be sent out to the internal data bus 19 through the data word buffer 40 and data word latching circuit 41 and written in the group of memory ICs 1. The aforementioned operations are all timed by the timing signal generated by the timing generating circuit 49.

The error detecting circuit 48 connected to the redundant word generating/error checking circuit 45 detects the presence or absence of 1 bit error and sends out a detection signal to the terminal machine to the error detecting signal line 16. This detection signal is used in the terminal machine as the CPU interrupt signal.

Figure 7:
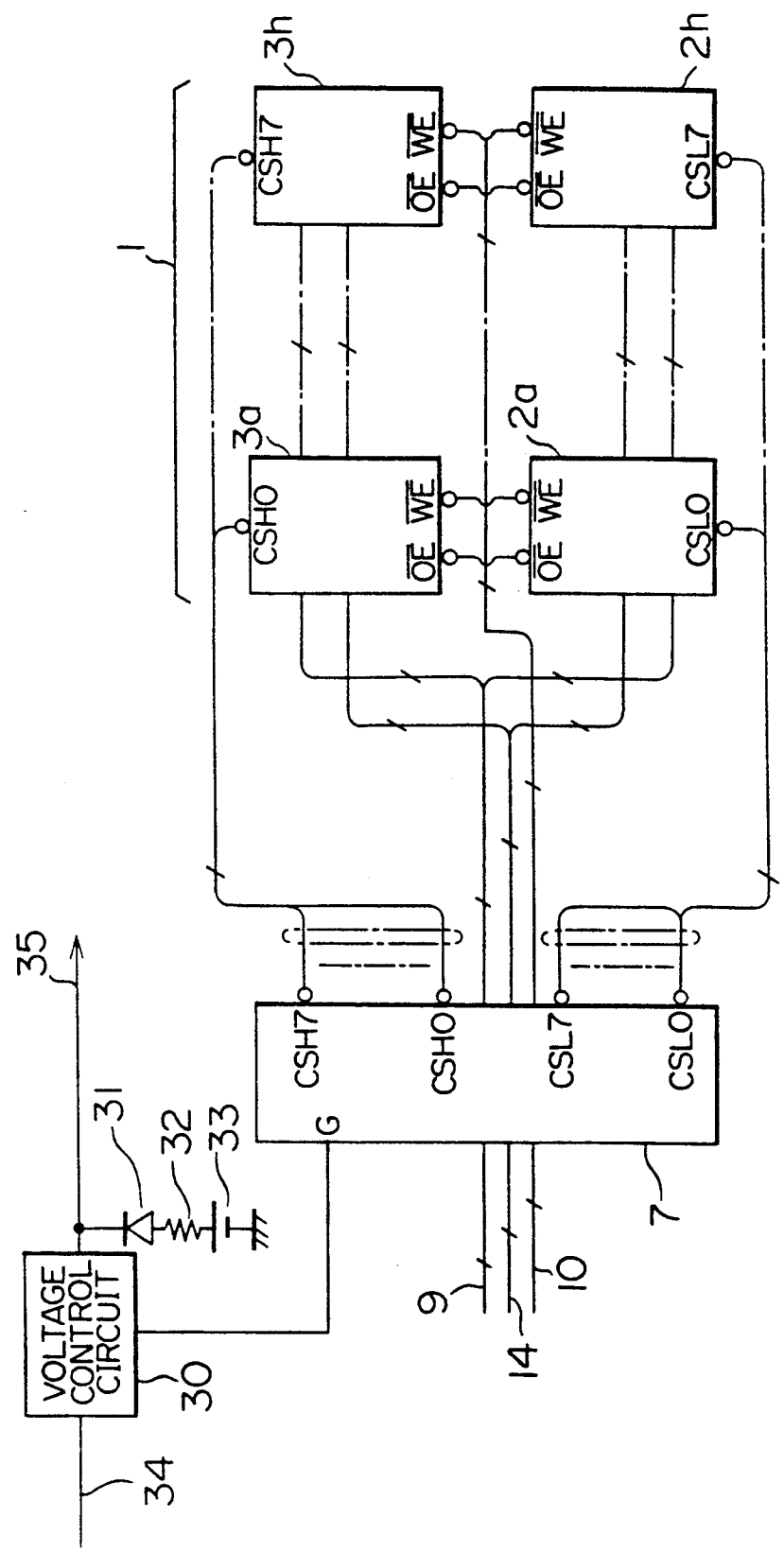
FIG. 7 is a block diagram of a conventional portable semiconductor data storage device.

When no power is supplied from the terminal machine to the data storage device, such as when the data storage device carried from one place to another, power is supplied from the cell 33 to the internal power line 35 through the reverse-charge preventing diode 31 and limiting resistor 32 to back up the data stored in the individual memories in the groups of memory ICs 1 and 4, as in the case of the conventional data storage device shown in FIG. 7.

As will be understood from the foregoing description, in this embodiment, a redundant word having a length corresponding to that of the data word is generated and stored in predetermined memories in the group of memory ICs 4 in the writing cycle, and error detection/correction can be made in accordance with the data word length in the reading out cycle. Consequently, the number of memories for storing the redundant word can be reduced.

In the above-described embodiment, 1-bit error detection and correction have been described. However, 2-bit error detection and 1 bit error correction may also be performed. In this case, it is necessary for data word expressed by $2^{(k-1)} - 1 \geq N$ and $N = M + K$. In the cases of, for example, a data bus whose M=8 bits, a redundant word having a length of at least 5 bits is required. In the case of a data bus whose M=16 bits, a redundant word length of at least 6 bits is required. Generally, the data bus of the memory ICs is 8 bits, and storage of a redundant word such as that shown in FIG. 4 cannot thus be made. However, 2-bit error detection and 1-bit error correction can be achieved by providing a plurality of memory ICs in the group of redundant word memory ICs 4, i.e., by providing a plurality of least significant byte storing ICs and a plurality of most significant byte storing ICs.

What is claimed is:

1. A portable semiconductor data storage device comprising:

data word storage means for storing data words each data word having one of a first data bit length and a second data bit length, wherein the second data bit length is longer than the first data bit length;

redundant word storage means for storing redundant words corresponding to the data words, the redundant words having a first redundant word length and a second redundant word length respectively corresponding the first data bit length and the second data bit length, the redundant words of the first and second redundant word lengths containing error detection and error correction data, wherein the second redundant word length is longer than the first redundant word length;

a timing generating circuit, coupled to an external control bus, for generating a first/second length switch-over signal indicative of whether a data word has the first data bit length or the second data bit length;

error detection means, coupled to the data word storage means, the redundant word storage means, and the timing generating circuit, for receiving the first/second length switchover signal and for detecting an erroneous bit in a data word stored in the data word storage means using that data word and the corresponding redundant word stored in the redundant word storage means and from the first-/second length switch-over signal; and error correction means for correcting the erroneous bit detected by the error detection means.

2. The portable semiconductor data storage device of claim 1 wherein the data word storage means includes least significant byte storing memories for storing a least significant byte of the data words and most significant byte storing memories for storing a most significant byte of the data words, the first data bit length is 8 bits and includes one of the least significant and the most significant byte, and the second data bit length is at least 16 bits and includes both the least significant and the most significant byte.

3. The portable semiconductor data storage device of claim 2 wherein the redundant word storage means includes byte storage memories, the first redundant word length is 4 bits, the second redundant word length is at least 5 bits, two redundant words of the first redundant word length are stored in a single byte of a byte storing memory of the redundant word storage means, and redundant words of the second redundant word length are respectively stored in a single byte of a byte storing memory of the redundant word storage means.

4. The portable semiconductor data storage device of claim 1 wherein the error detection means detects an erroneous bit in a data word in a parity computation using the data word and the corresponding redundant word.

* * * * *